United States Patent [19]

Boisset

[11] Patent Number: 5,295,732
[45] Date of Patent: Mar. 22, 1994

[54] BACK OF VEHICLE SEATS

[75] Inventor: Bernard Boisset, Etampes, France

[73] Assignee: Bertrand Faure Automobile "BFA", France

[21] Appl. No.: 857,183

[22] Filed: Mar. 25, 1992

[30] Foreign Application Priority Data

Mar. 28, 1991 [FR] France ............... 91 03785

[51] Int. Cl.$^5$ .................................. A47C 7/02
[52] U.S. Cl. ........................ 297/452.1; 297/191; 297/228.1
[58] Field of Search ............ 297/452, 191, 460, 219

[56] References Cited

U.S. PATENT DOCUMENTS

| | | |
|---|---|---|
| 4,558,905 | 12/1985 | Natori . |
| 4,583,783 | 4/1986 | Kanai ............... 297/452 |
| 4,615,561 | 10/1986 | Nomura ............ 297/452 X |
| 4,643,480 | 2/1987 | Morita .............. 297/219 X |
| 4,699,427 | 10/1987 | Kobayashi . |
| 4,747,638 | 5/1988 | Saito . |
| 4,832,400 | 5/1989 | Aoki et al. ........ 297/219 X |
| 5,161,854 | 11/1992 | Yokoto et al. .... 297/219 X |

FOREIGN PATENT DOCUMENTS 2562001 10/1985 France .

Primary Examiner—Laurie K. Cranmer
Attorney, Agent, or Firm—Larson and Taylor

[57] ABSTRACT

A vehicle seat back having a reentrant rear face constituted by a rigid upsidedown U-shaped frame (1), by a resilient sheet (N) tensioned inside said frame, and by padding (5) of flexible material. The seat back includes three J-shaped metal section bars respectively constituting two uprights (7) and a top horizontal cross-member, together forming an upsidedown U-shape, the bars being welded to the frame, each opening of the J-shapes being occupied by an adjacent edge of a facing (6) that covers the padding (5), a horizontal metal bar welded to the bottom of the frame, a flexible panel (10) bounded laterally by two hems (12) and along the top by a horizontal line of stitching to the facing, and two L-shaped metal rods (17) each comprising a vertical length ($17_1$) received in a corresponding one of the two hems, which length has its top end fixed to the cross-member, and a horizontal bottom length which is fixed to the bar.

3 Claims, 2 Drawing Sheets

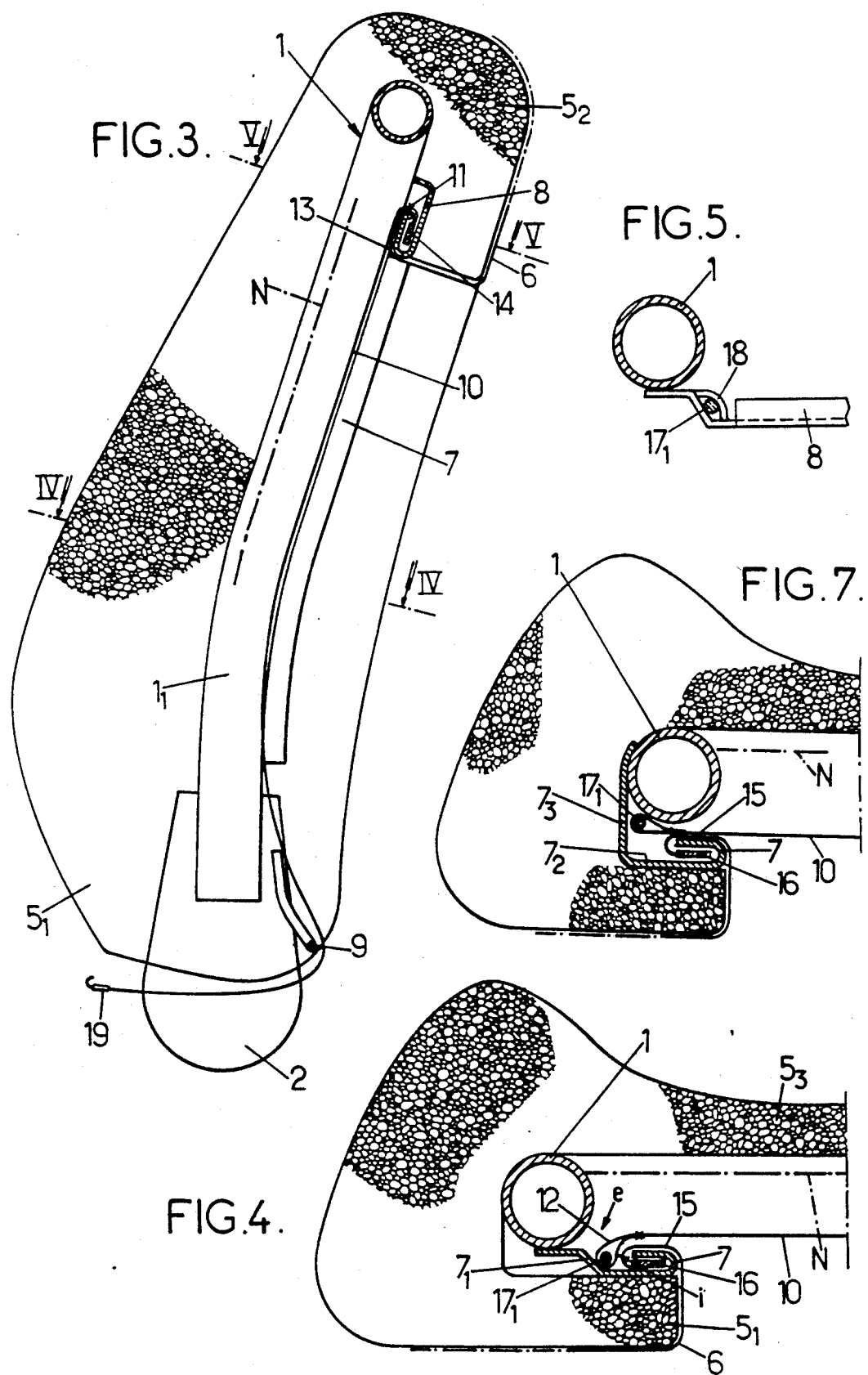

BACK OF VEHICLE SEATS

The invention relates to vehicle seat backs, and in particular the backs of the front seats of private vehicles.

More particularly, amongst such seat backs, the invention relates to backs constituted by a generally tubular rigid frame in the form of an upsidedown U-shape, by a resilient sheet stretched over the inside of the frame, and by padding of flexible and resilient material covering said frame and the front face of said sheet.

Still more particularly, the invention relates to backs of the kind in question having a rear face that is reentrant, i.e. that presents a recess.

Such a configuration is advantageous for several reasons.

In particular, the recess in question can receive the bent knees of the person sitting behind the seat back in question, thereby increasing passenger comfort for a given length of the corresponding vehicle, and for this reason among others a recessed rear face of a seat back is generally considered to be more pleasing in appearance than a flat rear face.

Proposals have already been made to make such recessed seat back rear faces by disposing section members on the frame of the seat back (which frame is set back inside the apparent outline of the padding), which section members are of plastic material having narrow openings pointing towards the center of the frame and forming an upsidedown U-shaped assembly, the top and side edges of a rectangular panel that is vertical or slightly sloping relative to the vertical being inserted into the narrow openings of these section members so that the panel constitutes a front wall for the recess.

This technique suffers from several drawbacks, and in particular from the following drawbacks: the section members of plastic are expensive; they are fiddly and expensive to fit onto the frame, with this generally being done by riveting after the frame has been painted; and above all, the retention of the edges of the panel in the section members is not strong enough to make it possible to install a net in the vicinity of said edges for the purpose of carrying magazines or the like.

Above all, the object of the invention is to eliminate these various drawbacks.

To this end, seat backs of the kind in question are essentially characterized according to the invention in that they comprise:
- three J-shaped metal section bars respectively constituting two uprights and a top horizontal cross-member and together forming an upsidedown U-shape, the bars being welded to the frame so that the bases of their J-shapes lie on the inside of the frame and so that their openings face towards the outside of said frame, each opening of a J-shape being occupied by an adjacent edge of a facing that covers the padding, preferably stiffened by a rigid stick;
- a horizontal metal bar also being welded to the frame at the bottom and to the rear of the seat back;
- a flexible panel which is vertical or slightly sloping relative to the vertical and which is bounded laterally by two hems and along the top by a horizontal line of stitching along the adjacent edge of the facing; and
- two L-shaped metal rods each comprising a length that is vertical or that slopes slightly relative to the vertical received in a corresponding one of the above two hems, the top ends of said lengths being fixed to the cross-member, and each having a horizontal bottom length fixed to the bar.

In preferred embodiments, use is also made of one or both of the following dispositions:
- the fixing between the top end of each L-shaped rod and the cross-member is performed by forcing said end, preferably covered by a teat of plastic or elastomer material, into a channel constituted by punching formed in the vicinity of one of the two horizontal ends of the cross-member; and
- each bottom length of bent rod is fixed to the bar by stapling to an offset length of said bar.

In addition to these main dispositions, the invention also includes certain other dispositions which are preferably used simultaneously therewith and which are described in greater detail below.

A preferred embodiment of the invention is described below with reference to the accompanying drawings, which are naturally non-limiting.

FIGS. 1 and 2 of these drawings are perspective views respectively of the metal structure of a vehicle seat whose back is made in accordance with the invention and of the padding for fitting to said seat.

FIGS. 3, 4, and 5 are respectively a central vertical section through a seat back fitted with its padding, a half horizontal section through said assembly on line IV—IV of FIG. 3, and a fragmentary horizontal section through said assembly on line V—V of FIG. 3.

FIG. 7 shows a variant of a portion of FIG. 4.

Figure 1:
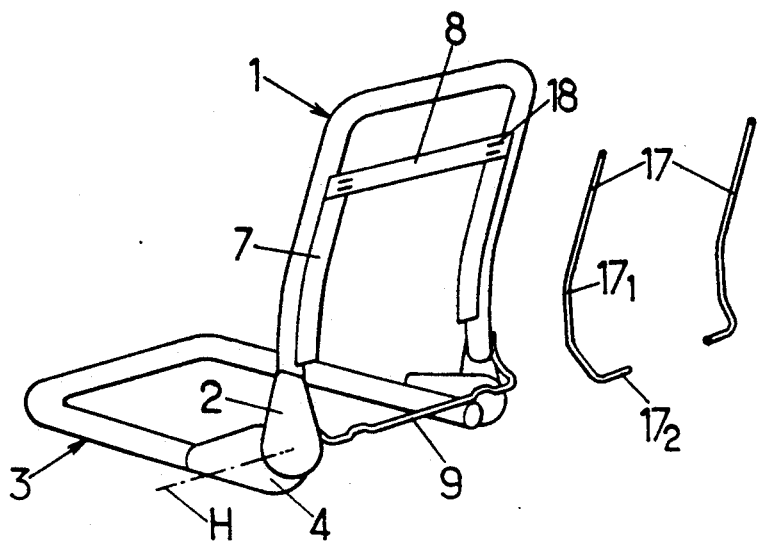

The structure of the seat in question comprises:
- a back frame constituted by a metal tube 1 curved to take up an upsidedown U-shape with its two sides being terminated at their bottom ends by longitudinally extending cheek pieces 2; and
- a seat frame likewise constituted by a metal tube 3 curved into a horizontal U-shape with two rearwardly extending sides that are terminated by vertical cheek pieces 4.

The cheek pieces 4 are pivotally mounted on the cheek pieces 2 about a horizontal axis H and they are associated with a mechanism (not shown) for adjusting the slope of the back.

In conventional manner, resilient sheets constituted by springs (not shown) are tensioned across each of the two frames.

The assembly constituted by the frame 1 for the back and the corresponding resilient sheet N is covered by thick padding 5 of resilient foam,, itself covered with a protective facing or coat 6 made of cloth, leather, or plastic, in particular.

Figure 2:
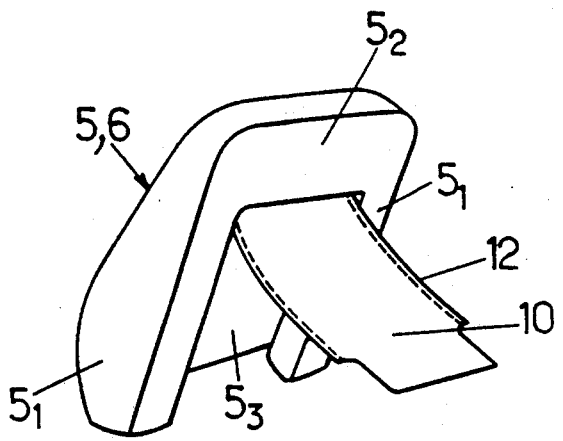

As can be seen in FIG. 2, the padding 5 is intended to be placed over the frame 1 like an upsidedown "sock", and essentially comprises two side portions $5_1$ held together by a top horizontal cushion $5_2$ and by a front member $5_3$.

In other words, the padding 5 covers the front face of the resilient sheet of the seat back but it does not cover its back face, which constitutes, so to speak, the front wall of a generally vertical @h which is open towards the rear of the seat back.

It is this front wall which is covered according to the invention by a panel which is easily and securely hooked to the remainder of the framework.

The procedure is as follows.

Two metal section bars 7 of J-shaped section are welded along the rear faces of the uprights $1_1$ of the frame 1 in such a manner that the curved edge of each J-shape extends inwardly into the frame while the opening of each J-shape is open towards the upright and towards the front of the seat back.

The two ends of a metal cross-member 8 likewise constituted by a J-section bar are also welded to the rear faces of the two uprights $1_1$ near the tops thereof so that the curved edge of the J-shape extends downwards while the opening of the J-shape is open upwards and towards the front of the seat back.

Finally, forwardly and upwardly curved ends of a horizontal rigid wire 9 are welded to the bottom of the frame 1 to constitute a fastening bar as described below.

A flexible panel 10 of cloth, leather, or plastic and substantially rectangular in shape is used to form the vertical or slightly sloping relative to the vertical front wall of the above-defined sloping trough which panel has a horizontal top edge 11 and two side hems 12 designed to form tubular housings.

The edge 11 is sewn or stitched along the horizontal bottom edge 13 of the portion of facing 6 that covers the horizontal cushion $5_2$ of the padding, which edge 13 is stiffened by a stick 14.

The padding 5 with the panel 10 suspended therefrom is then put into place on the frame 1 fitted with its welded section bars 7, 8, and 9, with the padding 5 being installed by an "upsidedown sock action", i.e. it is moved downwards and onto the frame.

The above extra thickness 14 is then inserted in the opening of the J-shaped cross-member 8, as can be seen in FIG. 3: this is done by folding both superposed sheets 6 and 10 through 180° where they overlie the free edge of the J-section member 8, as shown in FIG. 3, with the fastening between the top edge of the panel 10 and the bar 8 obtained in this way being very secure, particularly if the opening of the section member is somewhat narrow or has a tendency to close resiliently, as is preferred.

In similar manner, to the side J-section bars 7 are secured the vertical edges 15 of the portions of the facing 6 that cover the side cushions $5_1$ of the padding, which edges are stiffened by sticks 16: the way in which one of these steps 15 is folded through 180° around the free edges of the corresponding J-section bar 7 is clearly visible in FIG. 4.

It then remains to fix the two edges of the panel 10 and its base to the structure of the seat back.

The edges are secured by means of two L-shaped metal rods 17 (FIG. 1) each comprising a long length $17_1$ that is vertical or slightly sloping relative to the vertical, and that is extended at the bottom by a shorter horizontal length $17_2$ whose end is folded upwards.

The length $17_1$ is threaded through the hem 12 of the panel until its top end comes out of the top of the hem, and the top end is then assembled to the cross-member 8.

This assembly is advantageously performed by inserting said top end into a tunnel 18 formed by punching out a bridge in said cross-member (see FIG. 5).

To enable said insertion to be a force-fit without play, the corresponding end is advantageously previously covered with a cap or teat (not shown) made of plastic or of elastomer.

The hem 12 containing its length 17 is then placed in the space e left between the corresponding upright of the frame 1 and the opening of the groove defining the J-shape of the section bar 7.

The horizontal length $17_2$ extending the length $17_1$ under consideration is then fastened to the bar 9 using a staple.

To prevent subsequent relative horizontal displacement between the length $17_2$ and the bar, said length and said bar advantageously include transversely offset portions where the stapling is performed.

Thereafter, it suffices to fix the base of the panel 10 to appropriate support surfaces of the seat structure, in particular by means of suitable fasteners 19 after folding said base beneath the bar 9 and forwards relative to the seat back: said fasteners are advantageously of the resiliently extendable type so as to make it possible to allow the seat back to be adjusted in inclination about the axis H.

The panel 10 is thus securely fixed to the structure of the seat back.

Figure 6:
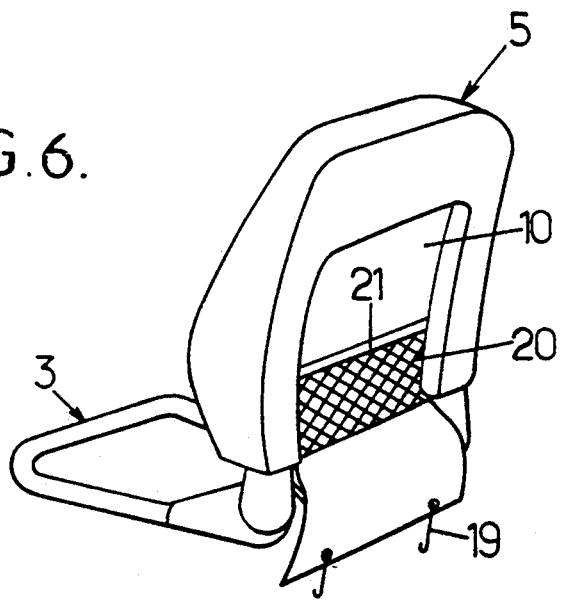
FIG. 6 is a perspective view of the structure of the FIG. 1 seat having its back fitted with padding of the invention.

This fixing is so strong that it lends itself easily to the addition of an upwardly open magazine-carrying net bag 20 (FIG. 6), with the net generally being fixed to the panel even before the top edge 11 of the panel is sewn to the facing 6.

In the embodiment shown in FIG. 4, the section bar 7 has a joggle $7_1$ enabling the J-shaped curved edge thereof to be offset a little rearwards relative to the seat back: this offset is not essential but it can be advantageous for avoiding any risk of contact between the resilient sheet N and the bar 7 during deformation of the sheet.

In the variant shown in FIG. 7, the bar 7 is shaped so that its J-shaped curved eft dow not practically project into the frame 1, but lies behind said frame so as to give maximum width to the recess formed in the rear of the seat back.

In this example, the J-shaped curved edge of the bar 7 is terminated by a transverse plane web $7_2$ of said bar which is in turn extended by a plane vertical longitudinal flange $7_3$ fixed to the outside edge of the corresponding upright $1_1$ by welding.

It can thus be seen that whichever embodiment is adopted, a seat back is made available whose rear face is delimited in the middle by a reentrant region having a flexible tensioned front wall, with said front wall being installed in a manner that is both strong and particularly easy to implement.

Naturally, as already follows from the above, the invention is not limited in any way to the applications and embodiments more particularly described, and on the contrary it extends to any variants thereof.

I claim:

1. A vehicle seat back having a reentrant rear face, the seat back comprising an upsidedown U-shaped rigid frame, a resilient sheet tensioned inside the frame, and padding comprising resilient and flexible material covering said frame and a front face of said sheet, the seat back having three J-shaped metal section bars respectively comprising two uprights and a top horizontal cross-member and together forming an upsidedown U-shape, the bars being welded to the frame so that bases of their J-shapes lie on an inside of the frame and so that their openings face towards an outside of said frame, each opening of a J-shape being occupied by an adjacent edge of a facing that cover the padding, a horizontal metal bar also being welded to the frame at a bottom thereof and to a rear of the seat back, a flexible panel which is vertical or sightly sloping relative to the vertical and which is bounded laterally by two hems and along a top thereof by a horizontal line of stitching along the adjacent edge of the facing, and two L-shaped metal rods each comprising a length that is vertical or that slopes slightly relative to the vertical received in a corresponding one of the above two hems, the top ends of said lengths being fixed to the cross-member, and each having a horizontal bottom length fixed to the bar.

2. A seat back according to claim 1, wherein the fixing between the top end of each L-shaped rod on the cross-member is performed by forcing said end into a channel constituted by punching formed in the vicinity of one of the two horizontal ends of the cross-member.

3. A seat back according to claim 1, wherein each bottom length of bent rod is fixed to the bar by stapling to an offset length of said bar.

* * * * *